UNITED STATES PATENT OFFICE.

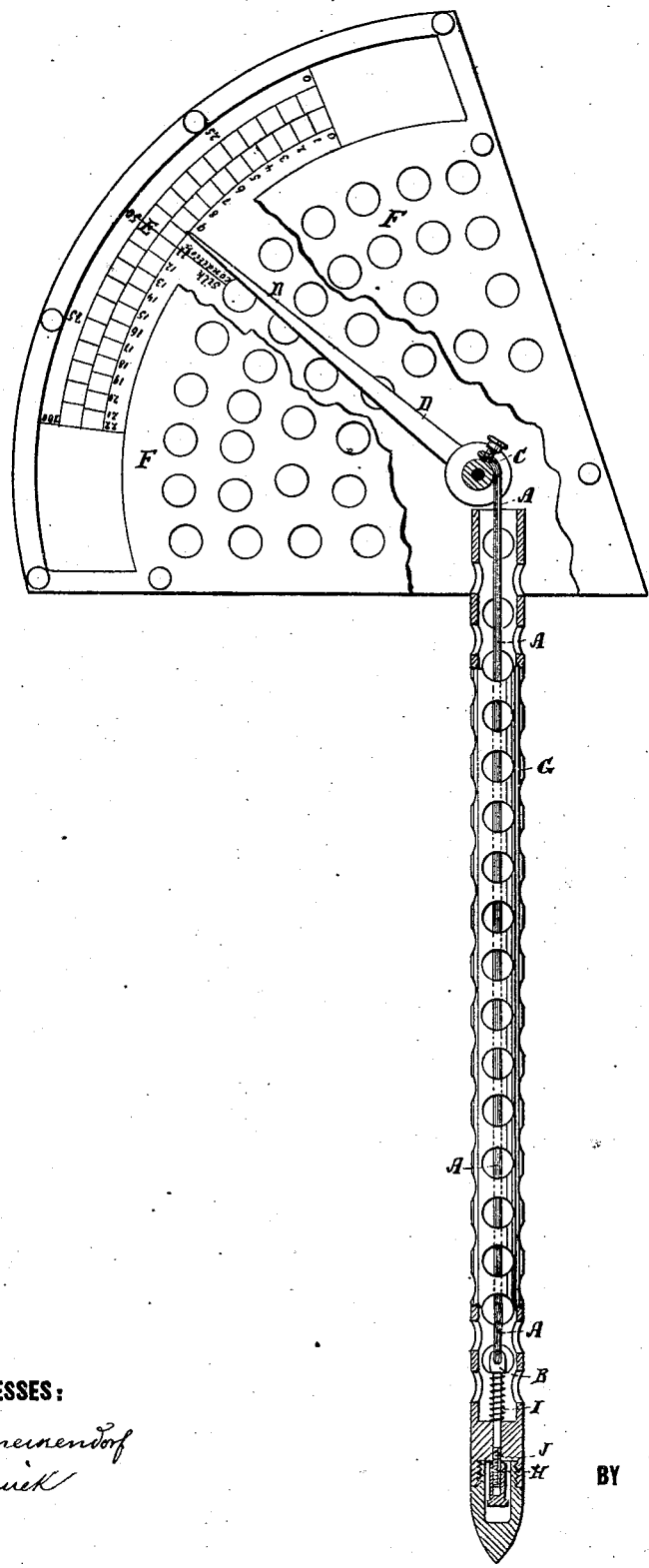

OSCAR SEEBASS, OF NEW YORK, N. Y., AND ROBERT SIMON, OF WEST HOBOKEN, NEW JERSEY.

IMPROVEMENT IN HYGROSCOPES.

Specification forming part of Letters Patent No. 159,043, dated January 26, 1875; application filed July 3, 1874.

*To all whom it may concern:*

Be it known that we, OSCAR SEEBASS, of the city, county, and State of New York, and ROBERT SIMON, of West Hoboken, in the county of Hudson and State of New Jersey, have invented a new and Improved Silk-Conditioner, of which the following is a specification:

Our invention consists of silk or other hygroscopic threads or substances, made fast at one end to a fixed object, and connected at the other end to a pulley on fine pivots, and carrying a pointer, which sweeps along a scale, according as the threads contract and raise it, or expand and allow it to fall, the said threads being in a protecting-case composed of a tube with numerous large perforations, to allow the air to act freely on the threads, and pointed at the end containing the fixed connection of the threads, to allow the tube to be thrust into a bale of silk, cotton, wool, or other substance, to subject the hygroscopic threads to the aqueous condition of the interior of the goods, and thus obtain by the scale a true record of the state or condition of the goods as to moisture, as a means of arriving at the actual weight of the goods at the commercial standard of moisture.

Bales of raw silk and other goods cannot be accurately rated as to weight until "conditioned," owing to the great variations in moisture, and consequently of weight, they undergo by atmospheric influences; consequently, in Europe, for instance, all bales have to be sent to the testing or conditioning house, where the bale and samples from different parts of the bale are weighed, and the samples subjected to a standard mode of treatment to bring them to the commercial standard of moisture, and then weighed again, and the true weight of the bale for the standard condition calculated therefrom, and when ascertained duly certified.

Now, we propose to provide an instrument by which the labor and expense of conveying the bales to and from the conditioning-house and the charges for conditioning will be saved, and both buyer and seller may condition the goods for themselves.

The said instrument is represented in the accompanying drawing, partly in sectional elevation, and partly in side elevation.

A represents the threads, for which raw silk as reeled from the cocoon is best; B, the fixed object to which they are connected at one end; C, the pulley to which they are connected at the other end; D, the pointer or index carried by the pulley; E, the graduated scale around which the pointer sweeps; F, the case containing the scale, pointer, and pulley; and G, the perforated and pointed protecting-tube or case, along which the threads are stretched.

The object B, to which the threads are connected in the bottom of the tube, is a hook, confined by an adjusting-screw, J, below the block H, and by a spring, I, above said block, by which the hook is adjusted to the required position and there retained, the adjustment being effected by the screw J. The threads and the pulley will be adjusted to draw the pointer to the zero-mark for any predetermined condition of dryness, taking a degree about as dry as they can well be made, and to allow the pointer to swing to the other end of the scale, where the maximum of moisture exists, the range for the pointer being about a quarter-circle, more or less, which may be graduated so that the degrees of the scale will correspond to the commercial standard of per cent. of moisture for silk; or the Saussiere or other hygrometer scale may be used, in which case the relation of the condition of the bale indicated by the pointer to the commercial standard will be found by calculation after locating the commercial standard on the scale, and by the same plan the condition of wool, cotton, hemp, flax, and other goods may be ascertained.

E' represents a scale in which the degrees correspond to the per-centum scale employed in commerce for rating raw or thrown silk. By this scale eleven per cent. of moisture is the standard condition, which we have found by experiments to correspond with the fiftieth degree of hygrometric scale.

Having thus described our invention, we claim as new, and desire to secure by Letters Patent—

The hygroscopic threads of an instrument for testing moisture, combined and arranged with a protecting-case adapted to be inserted in a ball or package of silk or other goods, substantially as specified.

OSCAR SEEBASS.
ROB. SIMON.

Witnesses:
T. B. MOSHER,
ALEX. F. ROBERTS.